Jan. 18, 1955  A. W. MADL  2,699,925
HOUSEHOLD MIXER HAVING AXIALLY RETRACTABLE BEATERS
Filed July 9, 1953
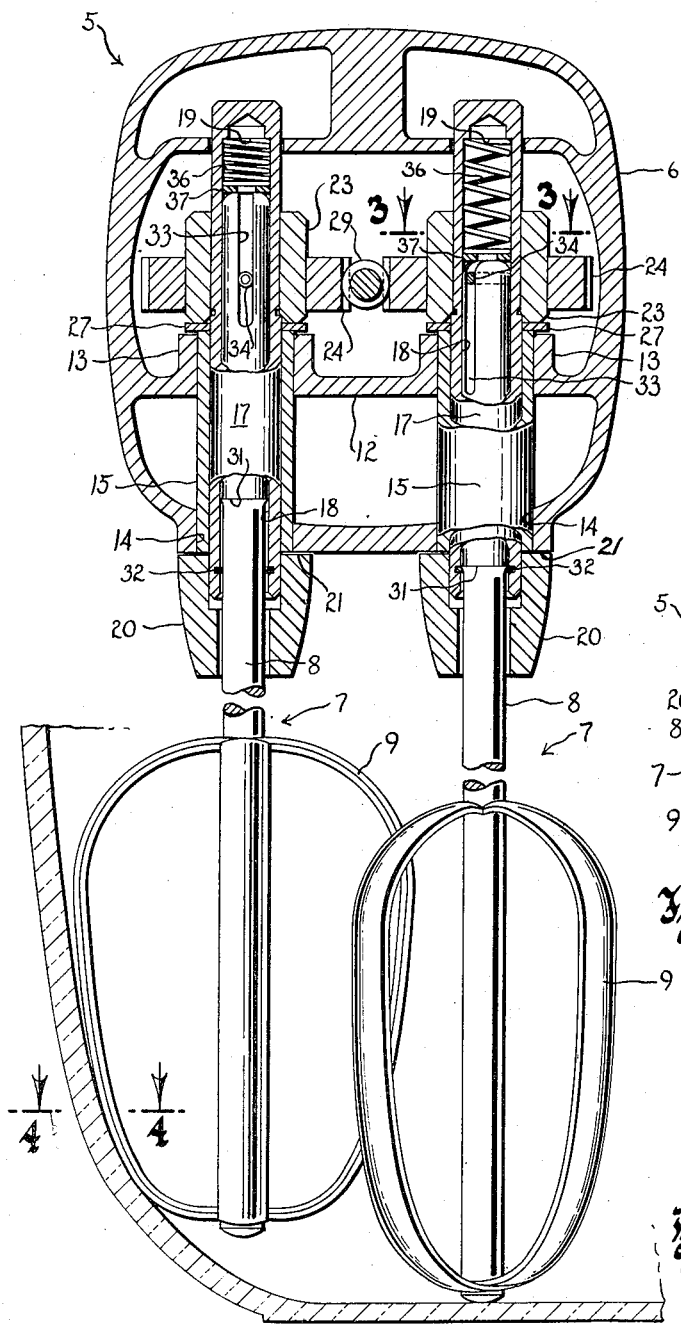
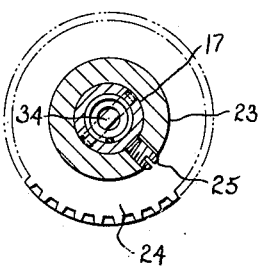
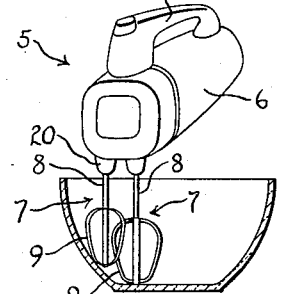
Inventor
Alfred W. Madl
By
Attorney

United States Patent Office 2,699,925
Patented Jan. 18, 1955

2,699,925

HOUSEHOLD MIXER HAVING AXIALLY RETRACTABLE BEATERS

Alfred W. Madl, Milwaukee, Wis., assignor to John Oster Manufacturing Company, Racine, Wis., a corporation of Wisconsin Application July 9, 1953, Serial No. 366,977

2 Claims. (Cl. 259—131)

This invention relates to mixers of the electric motor driven type which are used for the mixing of foods and liquids.

Electric food mixers of the household appliance type are, as a rule, either intended or adapted to be manually manipulated so that such mixers are likely to be used with a variety of mixing bowls not all of which are designed to complement the shape of the mixer beater blades. In those mixers which are merely adapted to be manually held but which are intended to be normally mounted on a pedestal, the mixer is ordinarily provided with one or more mixing bowls which are specially designed to complement the shape of the beater blades with which the mixer is provided, and the pedestal or mounting for the mixer is so designed that the beaters and each of the bowls are held in a predetermined relationship to one another wherein the beater blades may efficiently sweep past the adjoining bottom and side wall surfaces of the bowl without striking the same when the bowl is rotating on its platform.

Heretofore, however, if a bowl other than that supplied with a mixer was used, or if the mixer was taken off its pedestal and manually manipulated, difficulty was encountered in getting the blades to sweep closely adjacent to the walls of the bowl, especially where the bowl was not shaped to complement the shape of the beater blades. As a result, it was necessary to use a spoon or paddle to scrape the material undergoing mixing away from the walls of the bowl and into the zone of influence of the beater blades, or else to do a great deal of awkward maneuvering with the mixer itself during the course of which the mixer was tilted, frequently with the result that part of the mixture was thrown outside the bowl by the beaters.

In the mixer of the present invention the beaters are so mounted as to have a sufficient, although limited, independent axial movement to permit the mixer to be operated with both of its beater blades in close contact with the inner surface of the bowl in substantially all portions of the mixing bowl to which the mixer may be moved. Because the beaters are free to move axially, independently of one another, the zone of influence of the beaters in the mixer of this invention can be brought closer to the side wall of the bowl than has heretofore been possible, while the mixer can at all times be held with its beater axes substantially vertical to avoid throwing mixture outside the mixing bowl. This desirable result springs from the fact that the beater which is nearest the side wall can cam itself upwardly, along the divergently curved surface joining the side wall of the bowl with its bottom, to a higher level at which the bowl has a greater diameter than at its bottom, thereby allowing the other beater to operate closer to the side wall of the bowl. In mixers heretofore available it was not possible to bring the mixing zone this close to the side wall of the bowl unless the mixer was bodily lifted and held against its normal tendency to drop down the curved junction between the side and bottom walls, and this was, of course, relatively difficult and tiring to accomplish.

It is therefore an object of the present invention to provide an electric household mixer of the character described having "knee action" beaters; i. e., beaters which are capable of independent axial motion through a limited distance and which are yieldingly biased to a normal position such that engagement of one of the beaters with an upwardly curving surface of the bowl with which the mixer is used will cause said beater to cam itself upwardly against such bias so that the beaters can readily accommodate their positions to mixing bowls of most ordinary contours. From this it follows that an object of this invention is to provide a mixer having beaters capable of operating either at a common level or at different levels, depending upon the shape of the bowl or other vessel with which the mixer is used and the portion thereof in which the beaters are operating.

Another object of the present invention resides in the provision of an electric food mixer of the character described which may be operated either as a hand held mixer or as a pedestal mounted mixer and which is particularly adaptable for use as a hand held mixer by reason of the fact that it is provided with longitudinally yieldable beaters so that the beaters can readily accommodate their positions to the countours of every portion of a mixing bowl to which the mixer might be moved by the operator.

A further object of this invention resides in the provision of an electric food mixer of the character described having beater blades which are so shaped as to further the attainment of the foregoing objectives.

Still another object of the present invention is to provide a simple and inexpensive mounting for the beaters of a mixer of the character described which enables the beaters to be independently moved endwise between extended and retracted positions without disrupting the driving connection thereto, and from which mounting the beaters can be readily withdrawn for cleaning.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which:

Figure 1 is a perspective view of the mixer of this invention shown in operative relation to a mixing bowl with which it may be used and illustrating the independent axial movement of the beaters;

Figure 2 is a vertical sectional view of the mixer of this invention;

Figure 3 is a sectional view taken along the plane of the line 3—3 in Figure 2; and Figure 4 is a cross-sectional view taken on the plane of the line 4—4 in Figure 3.

Referring now more particularly to the accompanying drawings in which like numerals designate like parts throughout the several views, the numeral 5 designates generally an electric food mixer of the well-known household type comprising a housing 6 which encloses an electric motor (not shown) and from which a pair of beaters 7 extends downwardly. Each of the beaters comprises a shaft 8 having its upper end portion projecting into the housing to be operatively connected with the electric motor, and beater blades 9 are secured to the bottom portions of the shafts. The mixer of this invention may be operated as a conventional pedestal mounted mixer or may be used as a hand held mixer in somewhat the same manner as that shown in the patent to E. M. Brown et al., No. 2,525,338. To facilitate its operation as a hand held mixer, a handle 10 is provided at the top of the housing, or in instances where the housing is relatively small, the housing may itself provide the handle.

A transverse wall 12 extends across the interior of the housing and has a pair of integral bosses 13 which cooperate with apertures 14 in the bottom wall of the housing to support a pair of tubular upright bearings 15. The bearings are press-fitted or otherwise secured in the bosses and apertures and are disposed with their axes parallel to one another and substantially transverse to the longitudinal axis of the housing.

Rotatable in each bearing is an axially elongated socket or spindle 17 having a well or bore 18 opening to its bottom and a downwardly facing shoulder 19 at its top defined by the bottom of the well. Upward displacement of each spindle in its bearing is prevented by means of a collar 20 which is press-fitted or otherwise secured to the lower end portion of the spindle and which has an upwardly facing shoulder 21 engaging the adjacent lower surface of the bearing. The collar 20 also serves to trim the lower end portions of the bearing and spindle and prevents the entry of food particles and other foreign matter thereinto.

Downward displacement of each spindle out of its bearing is prevented by means of the hub portion 23 of a driven worm gear 24, which is secured to the spindle above the bearing, as by means of a set screw 25 in the hub engaging the spindle. It will be appreciated that while the gear is shown as mounted on a tubular hub and secured thereto in any desired manner, the gear and hub may be formed as an integral unit. A thrust washer 27 between the under side of the gear hub portion and the upper surface of the bearing minimizes friction between these elements. It will be observed that the two driven worm gears 24 are disposed in a common plane and are at opposite sides of the housing axis, in positions to mesh with a worm 29 which extends forwardly from the motor between the two worm gears and is preferably secured directly to the motor shaft. The spindles are thus driven from the electric motor through the worm and worm gears and therefore rotate with the motor.

Each of the beaters 7 has a small downwardly facing circumferential shoulder 31 on its shaft, intermediate its upper end and its beater blade, and spaced a distance from its upper end which is considerably less than the depth of the well in the spindle. This shoulder cooperates with a spring ring 32 seated in an annular groove in the bore in the spindle, near the mouth thereof, to preclude downward displacement of the shaft out of the spindle. The upper portion of the beater shaft preferably has a slightly larger diameter than the lower portion in order to define this shoulder 31. It will be understood that upon the application of a sufficient amount of downward pressure to the shaft, the holding force of the spring ring may be readily overcome and the shafts may thus be withdrawn from the spindles to facilitate cleaning of the beaters.

According to this invention, the upper end portion of each beater shaft has a sliding splined connection with its spindle. In the present case this splined connection is afforded by a bifurcation of the upper end portion of each shaft to provide a slot 33 which accommodates a drive pin 34 secured in the spindle, extending across the bore thereof. The drive pin has its end portions received in aligned holes in the walls of the spindle, and displacement of the drive pin out of the spindle is prevented by reason of the fact that the hub portion of the driven gear encircles the portion of the spindle in which the drive pin is located. It will be seen that the normal lowermost position of the beaters is defined by the engagement of the shoulder 31 on the beater shaft with the spring ring 32, while the uppermost position of each beater may be defined by the engagement of the drive pin 34 with the bottom of the slot 33 in the beater shaft.

To prevent the normal weight of the mixer mechanism from driving the beaters all the way to their uppermost position when the mixer is in use, each beater is biased downwardly by means of a helical compression spring 36. The upper end of the spring reacts against the downwardly facing shoulder 19 which defines the bottom of the wall in the spindle, and the lower end of the spring reacts against a washer 37 which bears against the top of the beater shaft when the shaft is in place in the spindle. When the beater is withdrawn from its socket, outward displacement of the spring is precluded by reason of the engagement of the washer 37 with the drive pin. It will be understood that the springs should be light enough so that the beaters may be readily cammed upwardly by forces applied to their blades in directions substantially normal to the axes of the shafts so that the zone of influence of the beaters can be brought as close as possible to the side wall of a mixing bowl without the necessity for tilting or lifting the mixer to carry both beaters out of engagement with the bottom of the bowl.

Attention is directed to the shape of the beater blades in the mixer of the present invention, which converge toward the bottom of the shaft and which, moreover, are convex in cross section, to facilitate this upward camming of the beaters whereby the beaters are able to accommodate their positions to the contour of any usual mixing bowl. Each beater blade comprises a band bent to a substantially ovoid shape with its smaller end lowermost. This shape of the beater blade provides for a higher centrifugal force at the top of the blade which prevents dough and the like from climbing the beater shafts when the mixer is in operation. Two such bands disposed with their planes at right angles to one another are secured to the lower portion of each beater shaft, and the slots 33 in the two shafts are of course so disposed with respect to the orientation of the blades that when the beaters are installed in the mixer, their respective blades will not interfere with one another during rotation, but will travel in overlapping orbits. The blades are convex in cross section substantially throughout their length, being curved, as best seen in Figure 4, on a radius which is substantially smaller than the radius of the blade orbit at the lowest portion of the beaters, and with their convex sides facing outwardly of the shaft. This curvature of the blade facilitates the camming action whereby the beaters conform their axial placement to the mixing bowl contour, since the blade is not presented edgewise to the surface of the bowl during rotation, but instead the convex blade surface engages the mixing bowl surface with a relatively smooth camming action and with a minimum of noise.

From the foregoing description taken together with the accompanying drawing, it will be readily apparent that this inveniton provides an electrically driven mixer of the character described having beaters capable of independent axial movement, to enable the beaters to take positions conforming to the contour of any ordinary mixing bowl, and that the shape of the beater blades, moreover, is such as to further improve the operation of the mixer in this respect.

What I claim as my invention is:

1. In a portable mixer of the type having an electric motor enclosed in a housing and which rotatably drives beaters comprising a plurality of shafts extending downwardly from said housing, parallel to one another, and a beater blade on the lowermost portion of each shaft: a plurality of substantially tubular bearings mounted in spaced relation in the housing with their axes substantially parallel to one another and transverse to the axis of the housing, the mouths of the bores in said bearings opening to the exterior of the housing at the bottom thereof; a plurality of sleeve-like sockets, each rotatably mounted in one of said bearings and having a downwardly opening bore in which the upper end portion of one of the beater shafts is receivable, and each of said sockets having a downwardly facing shoulder in the upper portion of its bore; bifurcations at the upper end portion of each of said shafts defining an elongated slot; a drive pin having its end portions received in aligned holes in each of said sockets and extending across the bore of the socket to engage in the slot in a shaft in the socket and provide a splined connection between the shaft and the socket constraining the shaft to rotate with its socket but permitting the shaft a limited amount of axial motion; a driven gear secured to each of said sockets with its hub portion encircling the portion of the socket in which said pin is located to preclude displacement of the pin out of the socket; a driving gear drivingly connected with the motor and meshing with the driven gears; cooperating detent means on each of the shafts and in the sockets for defining the downward limit of axial movement of each shaft to thus retain the shaft in the socket, but permitting withdrawal of the shafts from the sockets upon application of downward force to the shafts; and a helical compression spring in each socket reacting between said shoulder in the socket and the top of the shaft therein to bias the shaft downwardly; said drive pin obstructing downward displacement of the compression spring when the shaft is withdrawn from the socket.

2. An egg beater type mixer comprising: a body structure; means on the body structure providing a pair of spaced apart bearings the axes of which are parallel to one another; an elongated sleeve journaled in each of said bearings; means constraining said sleeves against axial displacement from their bearings; each of said sleeves having a longitudinal bore open at one end and constricted at its other end to provide a spring seat facing the open end of the bore, said open ends of the bores facing downwardly during normal use of the mixer; a gear encircling and fixed to each of said sleeves intermediate the ends thereof; a drive gear journaled on the body structure between said sleeves and meshing with both of said sleeve-carried gears so that the sleeves are rotated in opposite directions by the drive gear; a pair of beaters each comprising an elongated shaft having one end portion slidably received in the longitudinal bore of one of the sleeves and projecting axially through the gear thereon, and beater blades fixed to the other end portion of the shaft; the beater shafts having longitudinal slots in the portions thereof embraced by the sleeve-carried gears; a pin extending across each sleeve at the area thereof embraced by the gear on the sleeve so that the gear holds the pin in place; said pins being received in the longitudinal slots in the beater shafts for transmitting torque from the sleeves to the beaters while permitting considerable axial sliding movement of the beater shafts in their sleeves; a coiled compression spring in the bore of each sleeve confined between the spring seat therein and the adjacent end of the beater shaft, said springs yieldingly urging the beater shafts outwardly of their sleeves; and cooperating shoulders on the beater shafts and the sleeves limiting spring produced projection of the beater shafts from the sleeves.

References Cited in the file of this patent

UNITED STATES PATENTS

| | | |
|---|---|---|
| 356,694 | Morey | Jan. 25, 1887 |
| 1,898,094 | Nies | Feb. 21, 1933 |
| 2,008,184 | Mross | July 16, 1935 |
| 2,013,887 | Jeppson | Sept. 10, 1935 |
| 2,098,098 | Jepson | Nov. 2, 1937 |
| 2,486,182 | Dempsey | Apr. 26, 1949 |
| 2,615,690 | Jepson | Oct. 28, 1952 |